(12) United States Patent
Lawyer et al.

(10) Patent No.: US 11,284,606 B2
(45) Date of Patent: Mar. 29, 2022

(54) HABITAT LIGHTING ASSEMBLY

(71) Applicant: ECOTECH MARINE, LLC, Allentown, PA (US)

(72) Inventors: Justin Lawyer, Bethlehem, PA (US); Mark Lindenmoyer, Coopersburg, PA (US); Christian Clough, Bethlehem, PA (US); Timothy Marks, Northampton, PA (US); Patrick Clasen, Allentown, PA (US)

(73) Assignee: EcoTech, LLC, Bethlehem, PA (US)

( * ) Notice: Subject to any disclaimer, the term of this patent is extended or adjusted under 35 U.S.C. 154(b) by 168 days.

(21) Appl. No.: 16/392,926

(22) Filed: Apr. 24, 2019

(65) Prior Publication Data
US 2019/0320627 A1 Oct. 24, 2019

Related U.S. Application Data

(60) Provisional application No. 62/661,715, filed on Apr. 24, 2018.

(51) Int. Cl.
*A01K 63/00* (2017.01)
*A01K 63/06* (2006.01)
(Continued)

(52) U.S. Cl.
CPC .......... *A01K 63/065* (2013.01); *A01K 1/0052* (2013.01); *A01K 1/0058* (2013.01);
(Continued)

(58) Field of Classification Search
CPC .... A01K 1/0058; A01K 1/0052; A01K 63/06; A01K 63/065; F21S 10/002;
(Continued)

(56) References Cited

U.S. PATENT DOCUMENTS 7,338,186 B1 * 3/2008 Wu .......................... F21S 2/005
362/294
9,839,206 B2 12/2017 Lawyer
(Continued)

OTHER PUBLICATIONS

CoolTech—Heat Pipes—cooltechnologiesinc.com/thermal-dispersion/heat-pipes/.
(Continued)

*Primary Examiner* — Y M. Quach Lee
(74) *Attorney, Agent, or Firm* — Berenato & White, LLC

(57) ABSTRACT

A lighting assembly includes a light guide having opposite first and second major surfaces and at least one edge surface extending between the first and second major surfaces, a solid-state light source arranged to emit light into the edge surface of the light guide, and a plurality of integrated optical elements associated with the first major surface to redirect the light emitted by the solid-state light source. The lighting assembly may further include an air circulation device and a heat transfer system configured to transfer heat generated by the solid-state lighting source to a flow of air generated by the air circulation device. The solid-state light source may include light-emitting diodes, laser diodes, and/ or organic light emitting diodes configured to produce multiple colors. Also provided is a habitat including the lighting assembly, and related methods.

20 Claims, 10 Drawing Sheets

(51) Int. Cl.
  *F21V 8/00*      (2006.01)
  *A01K 1/00*      (2006.01)
(52) U.S. Cl.
  CPC ......... *G02B 6/0036* (2013.01); *G02B 6/0055* (2013.01); *G02B 6/0085* (2013.01)
(58) Field of Classification Search
  CPC ........... F21W 2131/308; G02B 6/0036; G02B 6/0038; G02B 6/0055; G02B 6/0085
  See application file for complete search history.

(56) References Cited

U.S. PATENT DOCUMENTS

| | | |
|---|---|---|
| 2005/0069678 A1 | 3/2005 | Olczak |
| 2005/0135104 A1* | 6/2005 | Crabb .................... A01K 63/06 362/276 |
| 2007/0108900 A1 | 5/2007 | Boek |
| 2011/0255266 A1* | 10/2011 | Fredricks ............ F21V 33/0028 362/101 |
| 2013/0314944 A1 | 11/2013 | McCollum |
| 2015/0205016 A1 | 7/2015 | Hesse |
| 2018/0058674 A1* | 3/2018 | Reynolds ................ F21V 29/74 362/294 |
| 2018/0074257 A1 | 3/2018 | McCollum |
| 2019/0059340 A1* | 2/2019 | Brown .................. A01K 63/06 362/101 |

OTHER PUBLICATIONS

Optics Data Sheet—LGP Light Guiding Prismatic Plate—http://www.jungbecker.de/fileadmin/media/downloads/standard/Jungbecker_LGP_Standard_Produkte_1_Klasse_A4_E.pdf.

\* cited by examiner

HABITAT LIGHTING ASSEMBLY

CLAIM(S) OF PRIORITY AND CROSS-REFERENCE TO RELATED APPLICATION(S)

This application claims the benefit of priority of U.S. Provisional Application No. 62/661,715 filed Apr. 24, 2018, the complete disclosure of which is incorporated herein by reference.

FIELD OF THE INVENTION

This invention relates to a habitat lighting assembly, a habitat including a lighting assembly, and related methods.

BACKGROUND

Animal and plant habitats, for example aquariums, terrariums, green houses, etc., are environments housing one or more species of flora and/or fauna, such as fish, invertebrates, amphibians, marine mammals, turtles, plants or any combination thereof. These species require diligent care which includes specific control of environmental conditions within the habitats. Environmental conditions such as temperature, light wavelength and intensity, salinity, and flow control of air or water inside the habitat are regulated to accommodate for the sustainability or growth of the particular species living therein. Optimum conditions will vary from species to species.

One component of controlling the environmental conditions in a habitat is the amount and type of light. Standard lighting units typically utilize light emitting diodes (LEDs), and fluorescent or metal halide bulbs that produce light at a specific spectrum and intensity. These lights may be hung above the habitat or be part of a hood or other unit which connects directly to the habitat. Typical lighting units are designed to shine light downward to permit a user to observe the habitat and to sustain life within the habitat. LED lighting units are desirable because the spectrum they output can be adjusted using combinations of discrete colors.

A problem with standard lighting LED units is that the polychromatic light sources of typical lighting units each act as an independent "point light sources," which, when refracted through the moving surface of the water, create bands of light called "caustics" of different colors that are separated from each other. The separated caustics can lead to an effect in the habitat that can act as a distraction to the viewer. One way of reducing these banded caustics is to increase the number of LEDs or add a diffuser; however, doing so can increase energy costs, cause the lighting fixture to become overly large, and/or cause overheating of the lighting unit and/or of the habitat.

Further, the amount of light required by certain habitat species for sustaining life, such as through photosynthesis, can be relatively high, requiring a high energy density for the LEDs. LEDs operated at high power can overheat. As LEDs become hotter, their efficacy decreases, so that less light is provided to the habitat species for survival functions such as photosynthesis.

SUMMARY OF THE INVENTION

The disclosed invention is a LED lighting assembly for a habitat that has a light guide assembly having a plurality of integrated optical elements that diffuse the emitted light in order to eliminate caustics, particularly in an aquarium habitat.

According to a first aspect of the invention, a habitat lighting assembly includes a light guide having opposite first and second major surfaces and at least one edge surface extending between the first and second major surfaces. A solid-state light source is arranged to emit light into the edge surface of the light guide. A plurality of integrated optical elements is associated with the first major surface for redirecting the light from the solid-state light source.

According to a second aspect of the invention, a habitat lighting assembly includes at least an outer housing, an air circulation device configured to generate a flow of air into the outer housing through an air intake opening and out of the outer housing through an air discharge opening of the outer housing, a light guide comprising opposite first and second major surfaces and at least one edge surface extending between the first and second major surfaces, a solid-state light source arranged to emit light into the edge surface of the light guide, a plurality of integrated optical elements associated with the first major surface configured to redirect the light emitted by the solid-state light source, and a heat transfer system configured to transfer heat generated by the solid-state lighting source to the flow of air generated by the air circulation device.

A third aspect of the invention is a habitat lighting assembly including at least a light guide comprising opposite first and second major surfaces and at least one edge surface extending between the first and second major surfaces, a solid-state light source arranged to emit light into the edge surface of the light guide and comprising light-emitting diodes, laser diodes, organic light emitting diodes, or any combination thereof configured to produce multiple colors, and a plurality of integrated optical elements associated with the first major surface configured to direct light emitted by the solid-state light source upward toward the light reflector and/or downward.

A fourth aspect of the invention is a combination of a habitat and the habitat lighting assembly of any one of the first, second, or third aspects.

Other aspects of the invention, including apparatus, devices, kits, habitats, combinations, methods, processes, and the like which constitute part of the invention, will become more apparent upon reading the following detailed description of the exemplary embodiments.

BRIEF DESCRIPTION OF THE DRAWING(S)

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF THE EXEMPLARY EMBODIMENTS AND EXEMPLARY METHODS

Figure 1:
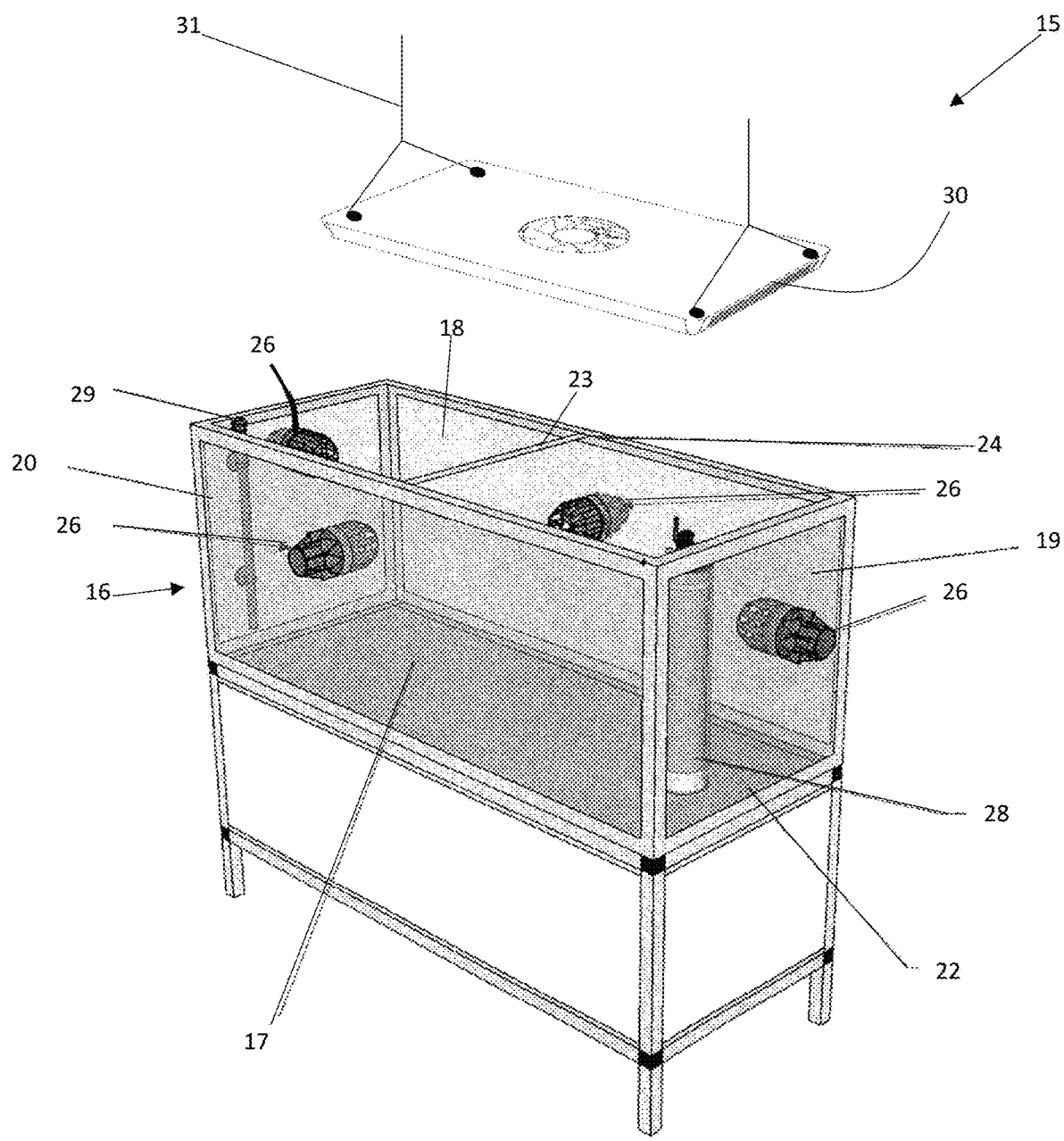
FIG. 1 is a perspective view of a habitat equipped with a lighting assembly according to an exemplary embodiment.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

FIG. 1 depicts a habitat 15 according to an exemplary embodiment of the invention. In a particularly preferred embodiment, the habitat 15 is an aquatic habitat such as a marine aquarium (e.g., fresh water or salt water), though aspects of the invention may extend to other embodiments using non-aquatic habitats. For example, the lighting assemblies embodied and described herein can be used as a light source for a wide variety of habitats, including those containing flora and/or fauna, such as fish, invertebrates, amphibians, marine mammals, turtles, plants or any combination thereof.

The habitat 15 includes a container or tank 16 having a pair of opposite side walls 17 and 18 spaced apart from one another and a pair of spaced end walls 19 and 20 extending between opposite side edges of the side walls 17 and 18. The tank 16 has a bottom wall 22 and a top opening 24 surrounded and defined by the top edges of the walls 17, 18, 19, and 20 to provide a habitat enclosure. A cover, such as sliding panels 23, may be placed over all or a portion of the top opening 24. The cover 23 may be either integral with or connected to the tank 16. The cover 23 may be transparent or provided with openings, such as a screen or grate. Though depicted as having a standard rectangular cross-sectional shape, the tank 16 may have different sizes, shapes, and configurations while including any number of walls. The walls 17-20 may be flat as shown, or they may be curved. The walls 17-20 of the tank 16 may be made from a variety of materials, especially transparent materials, including glass or plastics such as high-strength acrylics.

Components, such as pumps, fans, filters, etc., may be attached to or used in connection with the habitat 15 to alter or control the environment within the tank 16 or other type of enclosure. Depending on the organisms living in the habitat 15, different combinations of components may be appropriate. In the exemplary embodiment illustrated in FIG. 1, the habitat 15 includes multiple pumps 26, with each of the pumps 26 located on a respective one of the side walls 17 and 18 and the end walls 19 and 20 in the illustrated embodiment. The habitat 15 may also include a filter 28 and a heater 29. These components may collectively affect specific environmental conditions to the habitat 15. For example, the pumps 26 can create different flow types to mimic natural tides.

Figure 15:
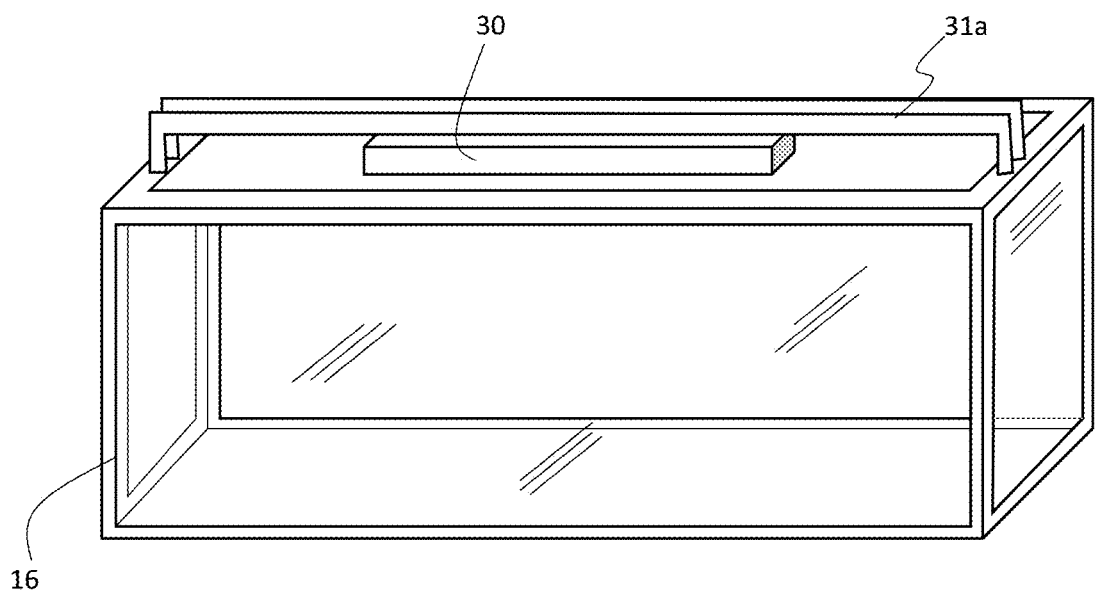
FIG. 15 is a perspective view of a habitat equipped with a lighting assembly according to another exemplary embodiment.

A lighting assembly 30 is suspended by suspension system 31, which is illustrated in FIG. 1 as comprising cables anchored to the ceiling (not shown). Alternatively, a floor stand or a tank-mounted bracket can be used to suspend the lighting assembly 30, or the lighting assembly 30 can be connected to, supported on, or integrated into the top of the tank 16. FIG. 15 shows one or more brackets 31a attachable to the top or sides of the tank 16 to suspend the lighting assembly 30 over the top of the tank 16.

Figure 2:
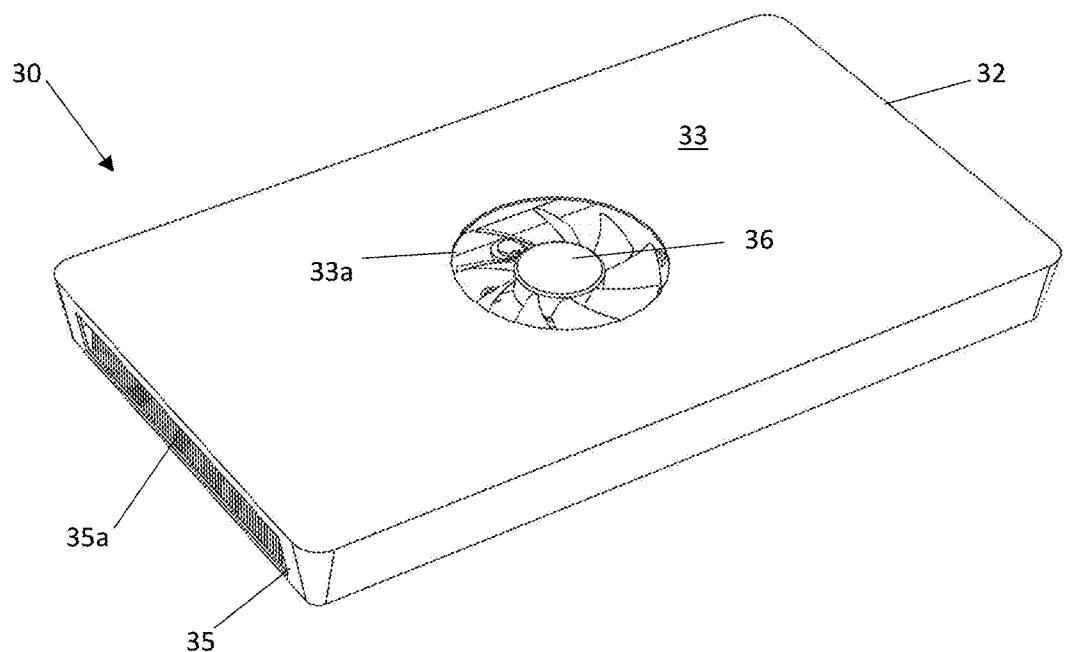
FIG. 2 is a top perspective view of the lighting assembly of FIG. 1.
Figure 3:
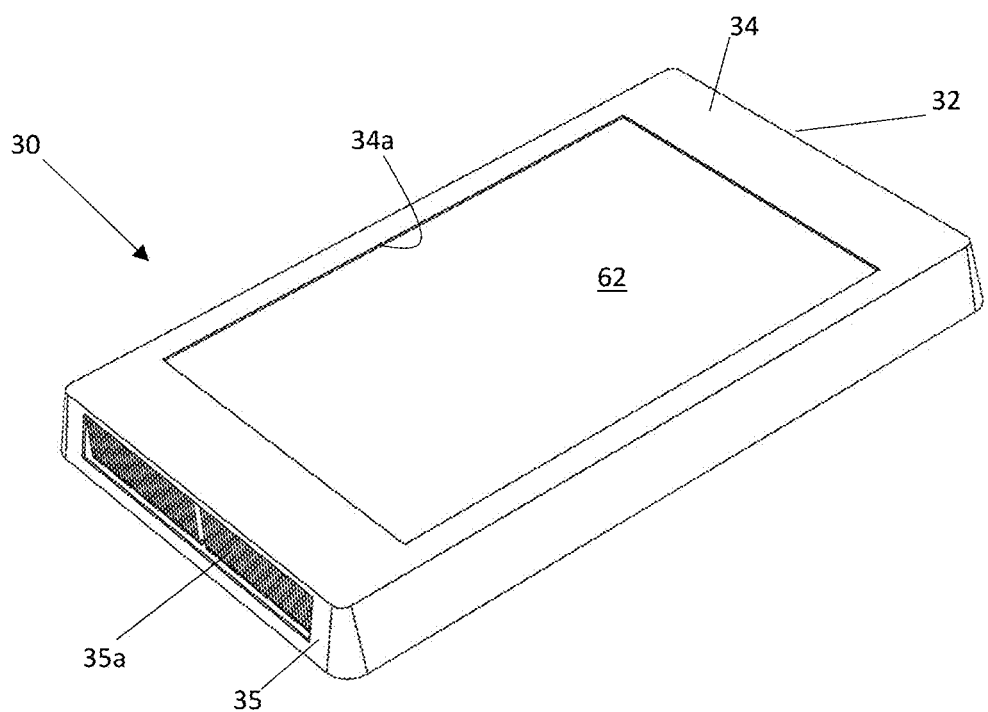
FIG. 3 is bottom perspective view of the lighting assembly of FIG. 1.
Figure 4:
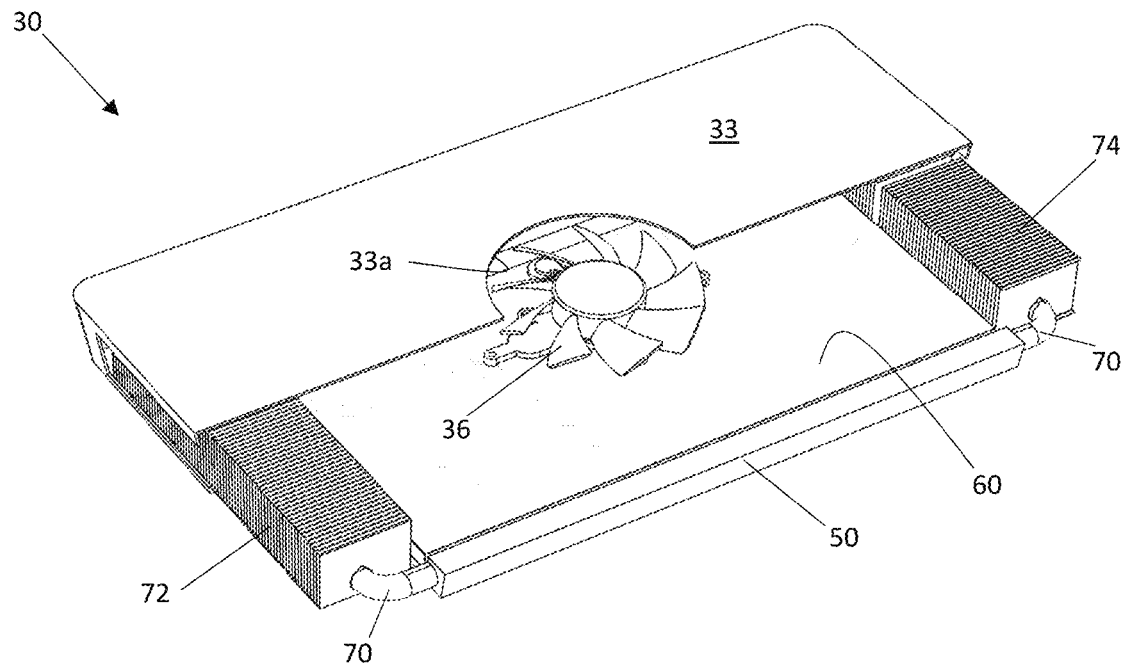
FIG. 4 is a top perspective view of the lighting assembly of FIG. 1 with a housing of the lighting assembly partially cut away.

FIGS. 2-10 depict an exemplary embodiment of the lighting assembly 30. The lighting assembly 30 includes an outer housing 32 that may be made of metal, plastic, composite, or other material. As best shown in FIG. 2, the outer housing 32 includes an upper surface 33, which can be part of a cover separable from and reattachable to the remainder of the outer housing 32. The upper surface/cover 33 has an air intake opening 33a embodied as a circular opening. As best shown in FIG. 3, the outer housing 32 further includes a lower surface or base 34 with a light-transmissive opening 34a embodied as a rectangle. The light-transmissive opening 34a may be an empty space or may have a transparent window. Side walls and end walls 35 extend between the upper surface/cover 33 and the lower surface/base 34. The end walls 35 include air discharge openings 35a. An air circulation device such as an impeller or fan 36 is positioned below the air intake opening 33a. The fan 36 draws air into the outer housing 32 through the air intake opening 33a, and the air exits the outer housing 32 through the air discharge openings 35a. The fan 36 may be mounted, such as with a bracket (not shown), to the cover 33.

As best shown in FIGS. 6, 8, 10, and 11, the lighting assembly 30 includes a light guide 40 embodied as a plate having a first major surface 41 (FIG. 10) facing upward and a second major surface 42 (FIG. 10) facing downward and opposite to the first major surface 41. The first and second major surfaces 41 and 42 are planar and parallel to one another. The first and second major surfaces 41 and 42 are parallel to one another, spaced apart, and define the thickness of the light guide 40. The thickness is less than the length and width of the major surfaces 41 and 42. Preferably, the thickness is uniform (with the possible exception of locations of optical elements 48 described below) over the entire length and width of the major surfaces 41 and 42. For example, the thickness may be in a range of 3.0 mm to 8.0 mm, such as 6 mm.

Figure 8:
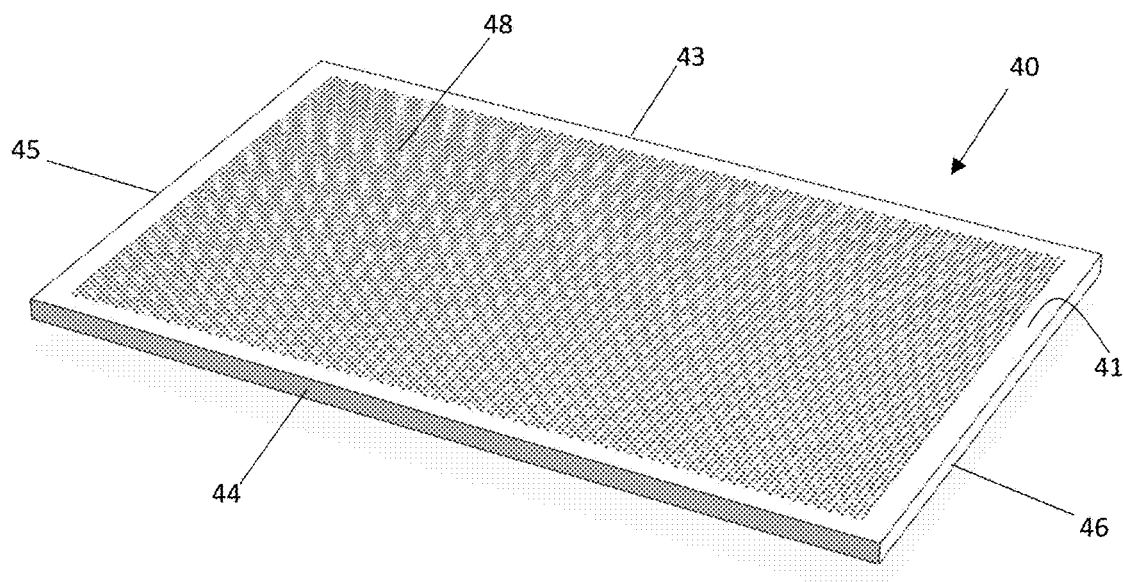
FIG. 8 is a top perspective view of a light guide of the lighting assembly of FIG. 1.
Figure 11:
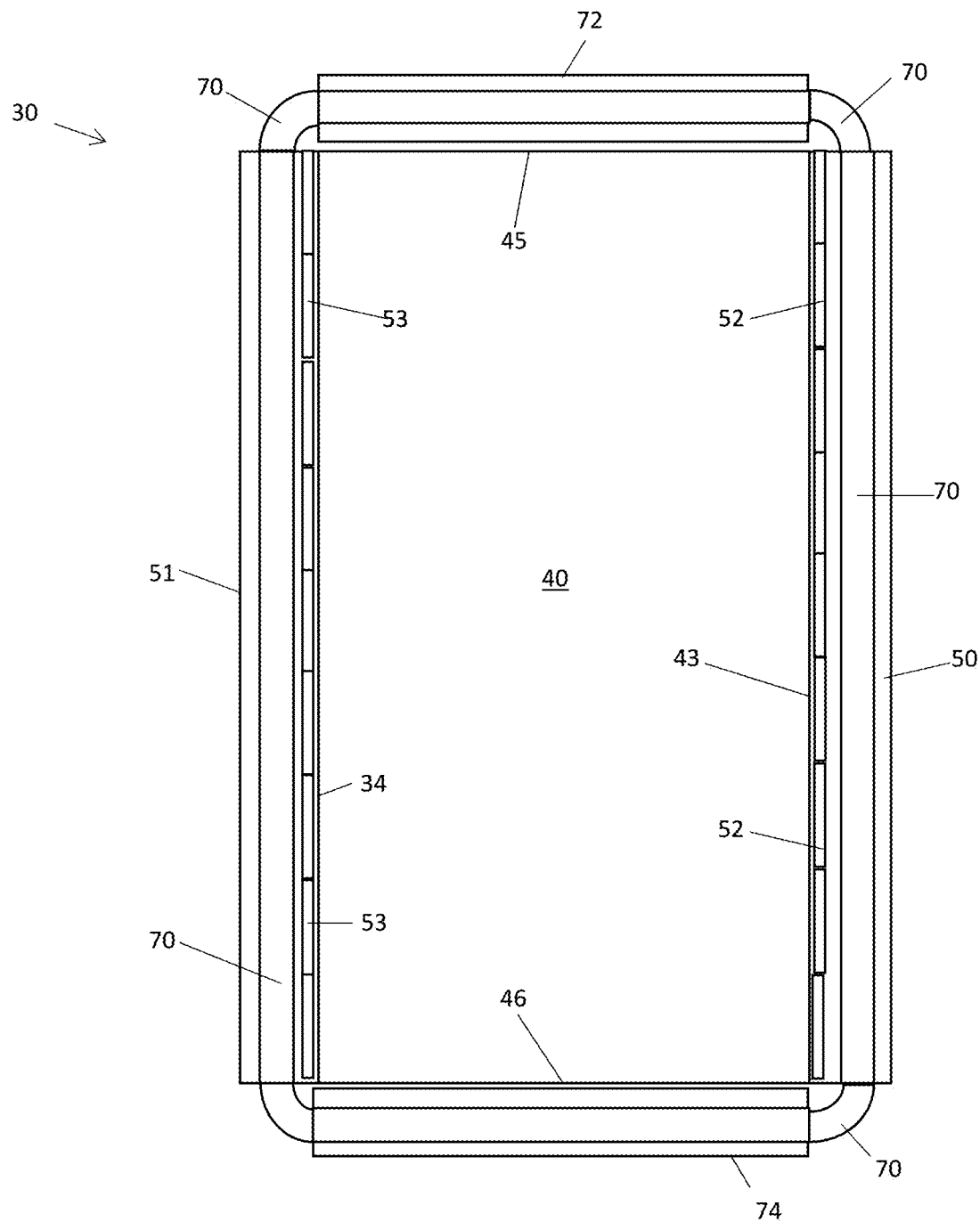
FIG. 11 is a horizontal cross section of the lighting assembly of FIG. 1 taken along sectional line 11-11 of FIG. 10.

As best shown in FIGS. 8 and 11, the light guide 40 includes side (lateral) edge surfaces 43 and 44 extending between the first and second major surfaces 41 and 42, and end edge surfaces 45 and 46 extending between the first and second major surfaces 41 and 42 and perpendicular to the side edge surfaces 43 and 44. End edge surfaces 45 and 46 of the light guide 40 are parallel to one another and spaced apart from one another by the length of the light guide 40. The side edge surfaces 43 and 44 are parallel to one another and spaced apart from one another by a width of the light guide 40.

While the light guide 40 is shown generally rectangular in shape, it should be understood that the light guide 40 may possess alternative shapes, such as that of a square or another polygonal shape. Any one or more of the edge surfaces 43, 44, 45, and/or 46 of the light guide 40 may be curved or non-linear. The thickness of the light guide 40 may vary so as to be non-uniform. Although the lighting assembly 30 is shown with a single light guide 40, it should be understood that the lighting assembly 30 alternatively may be provided with multiple light guides 40 layered one on top of another and/or in side-by-side arrangement.

The light guide 40 is preferably made of an optically transmissive material. Exemplary materials include plastics such as acrylics (e.g., polymethylmethacrylate PMMA), polycarbonates, and/or liquid silicone rubber (LSR). The light guide 40 may rest on the base 34 of the outer housing 32 or otherwise be secured to the outer housing 32.

Figure 9:
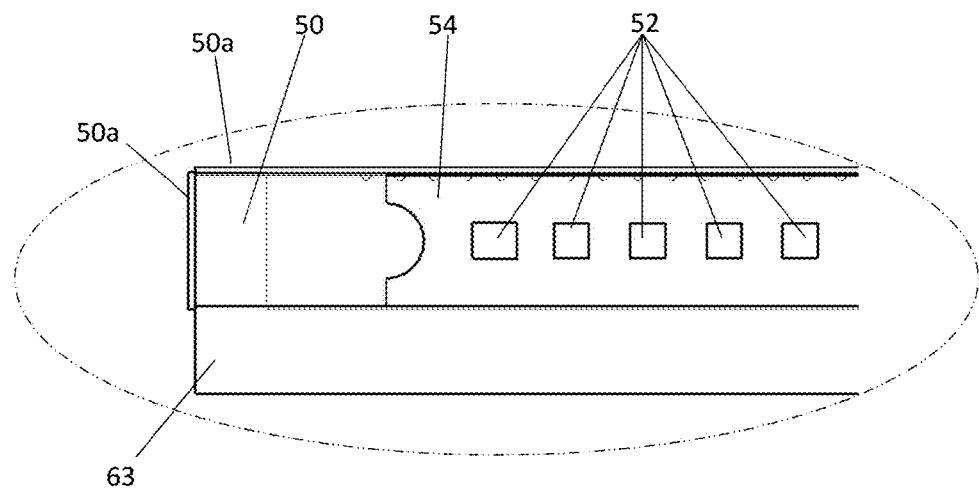
FIG. 9 is an enlarged fragmented view of oval 9 of FIG. 7.
Figure 10:
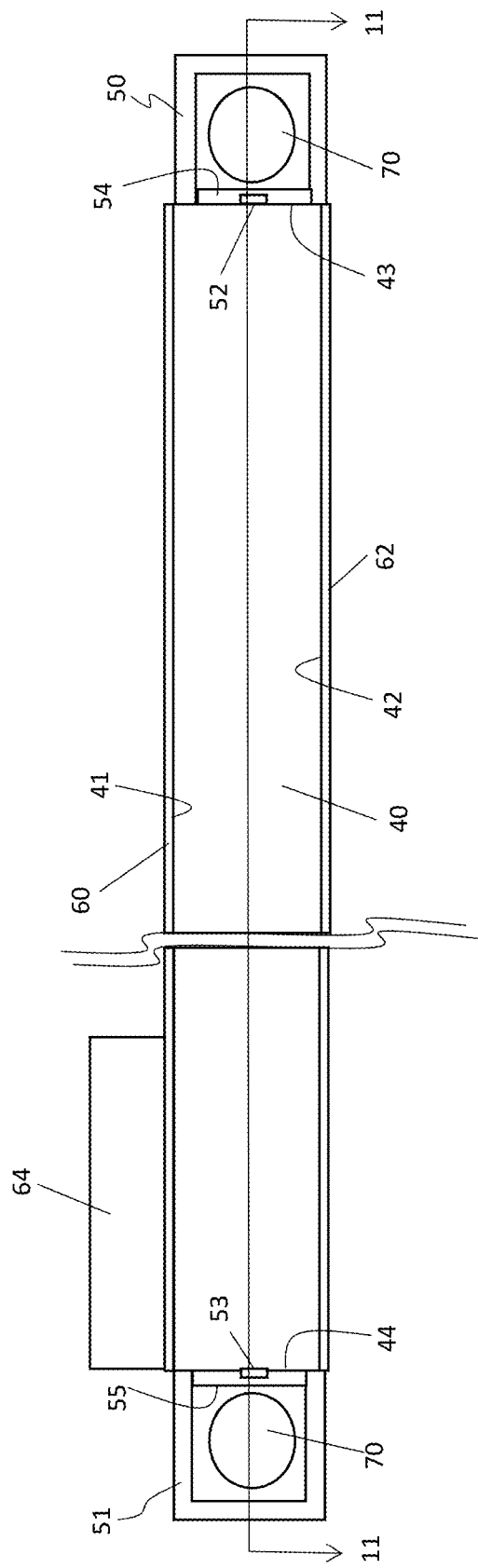
FIG. 10 is a cross-sectional view of the lighting assembly of FIG. 1 taken along sectional line 10-10 of FIG. 5.

First and second light source holders 50 and 51 are spaced apart from one another, one opposite sides of the light guide 40 adjacent to the side edge surfaces 43 and 44, respectively, as best shown in FIGS. 10 and 11. For the purposes of this embodiment, the first and second light source holders 50 and 51 are identical to one another, although it should be understood that they may differ. The light source holders 50 and 51 may be supported on or attached to a support base 63 (FIG. 9). Alternatively, the light source holders 50 and 51 may be attached directly to the light guide 40 or to the outer housing 32 using, for example, mechanical fasteners, adhesive, bonding, welding, etc. The light source holders 50 and 51 may be part of a frame surrounding the light guide 40. The light source holders 50 and 51 may be made of metal (e.g., aluminum), plastic, or another material. As best shown in FIG. 9, the first light source holder 50 can include light reflective linings 50a. The light reflective linings 50a can be made of cut pieces of reflective material, such as paper, coated paper, plastic, metal coated plastic, metal foil, etc., or a combination thereof. The surfaces of the light reflective linings 50a preferably are white or silver. Although not shown, the second light source holder 51 can include similar light reflective linings.

As best shown in FIG. 10, the first and second light source holders 50 and 51 each have a U-shaped cross-section/profile with an opening extending along their respective lengths to face the side edge surfaces 43 and 44, respectively, of the light guide 40. One or more first light sources 52 are arranged along the first light source holder 50 so as to be adjacent to and emit and introduced light into the light guide 40 through the side edge surface 43 of the light guide 40. One or more second light sources 53 are arranged along the opposite second light source holder 51 so as to be adjacent to and emit and introduced light into the light guide 40 through the side edge surface 44 of the light guide 40. The light sources 52 and 53 are preferably solid-state light emitters, such as semiconductor light emitting diodes (LEDs), laser diodes, and/or organic light emitting diodes (OLEDs).

The first light source(s) 52 may comprise a plurality of LEDs or other solid-state light emitters mounted on a printed circuit board (PCB) 54 arranged at the opening of the first light source holder 50. Likewise, the second light source(s) 53 may comprise a plurality of LEDs or other solid-state light emitters mounted on a printed circuit board (PCB) 55 arranged at the opening of the second light source holder 51. Attachment of the PCBs 54 and 55 to the first and second light source holders 50 and 51 and/or to the light guide 40 may be accomplished using, for example, mechanical fasteners, adhesives, bonding, soldering, welding, etc.

The first light source 52 and the second light source 53 are arranged to emit light into the side edge surfaces 43 and 44, respectively, so that the light propagates along the light guide 40 between the first and second major surfaces 41 and 42 of the light guide 40. The first light source 52 and the second light source 53 preferably are arranged along substantially the entire length of the side edge surfaces 43 and 44, respectively, to uniformly direct light into the opposite edge surfaces 43 and 44 of the light guide 40.

Alternative arrangements of light sources are possible. For example, the lighting assembly 30 may include fewer or more LEDs in the first and second light sources 52 and 53 than depicted in the drawings. The number of first light source LEDs 52 associated with the side edge surface 43 may be the same as or different than the number of second light source LEDs 53 associated with the side edge 44. While the light sources 52 and 53 are arranged adjacent opposite side edge surfaces 43 and 44 of the light guide 40 in the exemplary embodiment described above, in an alternative embodiment the light sources 52 and 53 are arranged adjacent the end edge surfaces 45 and 46. In another alternative embodiment, light sources 52 and 53 and additional light source (not shown) are respectively arranged along the edge surfaces 43, 44, 45, and 46. In yet another alternative embodiment, the light sources 52 and 53 are arranged along perpendicular edge surfaces, such as edge surfaces 43 and 45. In still another alternative embodiment, only one of the light sources 52 or 53 is provided and arranged along one of the edge surfaces, e.g., 43, 43, 45, or 46, with the other three edge surfaces not being associated with adjacent light sources. In a further alternative embodiment, light sources are arranged adjacent three edges surfaces, such as edge surfaces 43, 44, and 45, but not the fourth edge surface, e.g., 46.

Desirably, each of the light sources 52 and 53 includes multiple sets of LEDs (or OLEDs, etc.), with each of the LED sets of light sources 52 and 53 including multiple different color light sources, optionally including a white light source. Each color LED may be part of a single channel, so that the LEDs of the light sources 52 and 53 as a group provide a multi-channel light source. The light sources 52 and 53 may emit light in the non-visible spectrum, such as ultraviolet light and/or infrared light, if desired. The light sources 52 and 53 may be capable of emitting light over a range of intensities and wavelengths, or different light sources can be monochromatic or of a dedicated wavelength or intensity. In an exemplary embodiment, the light sources 52 and 53 emit light over ranges of wavelengths that are different or slightly overlap with one another. For example, the first and second light sources 52 and 53 may include different color groups of white, red, green, blue, royal blue, and/or violet. The wavelength of the light sources 52 and 53 may be individually controlled to selectively place them into an on-state or off-state to produce different colors, shades, and intensities of color. Each color group may be separated into an individual channel and controlled separately. Preferably the first and second light sources 52, 53 are capable of generating light that simulates natural sun light.

As best shown in FIGS. 4-6 and 10, a light reflector 60 is located adjacent to the upper first major surface 41 of the light guide 40. The light reflector 60 may be in direct contact with or spaced apart from the first major surface 41. The light reflector 60 may be a separate component from the light guide 40, such as a plate. Alternatively, the light reflector 60 may be a coating or film applied on the light guide 40. Preferably, the light reflector 60 extends at least the entire width and length of the light guide 40. The light reflector 60 may be white, specularly reflective, or diffusely reflective, depending upon the desired light output. The light reflector 60 may be made of cut pieces of reflective material, such as paper, coated paper, plastic, metal coated plastic, metal foil, etc., or a combination thereof.

Figure 6:
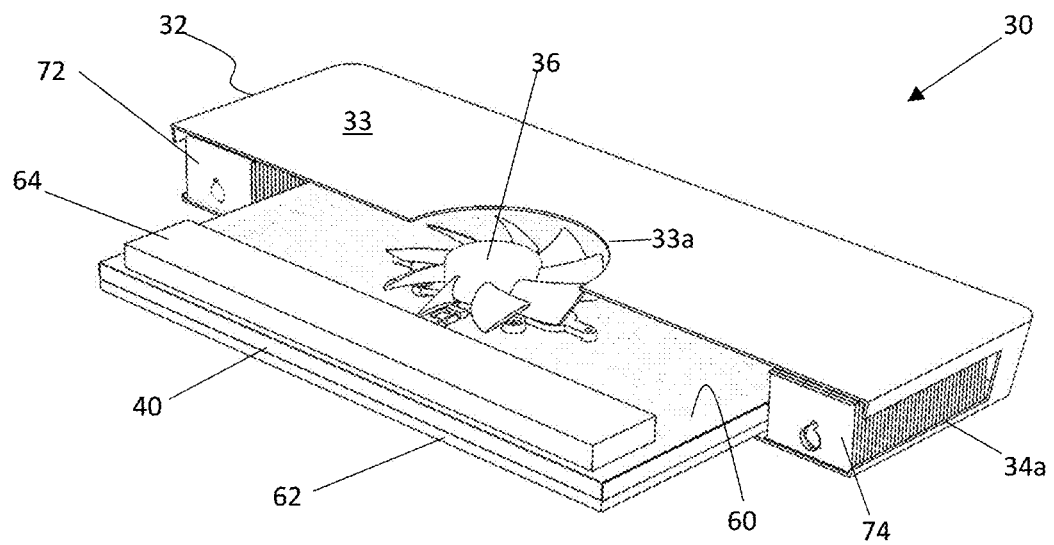
FIG. 6 is a side perspective, partially cut-away view of the lighting assembly of FIG. 1.
Figure 7:
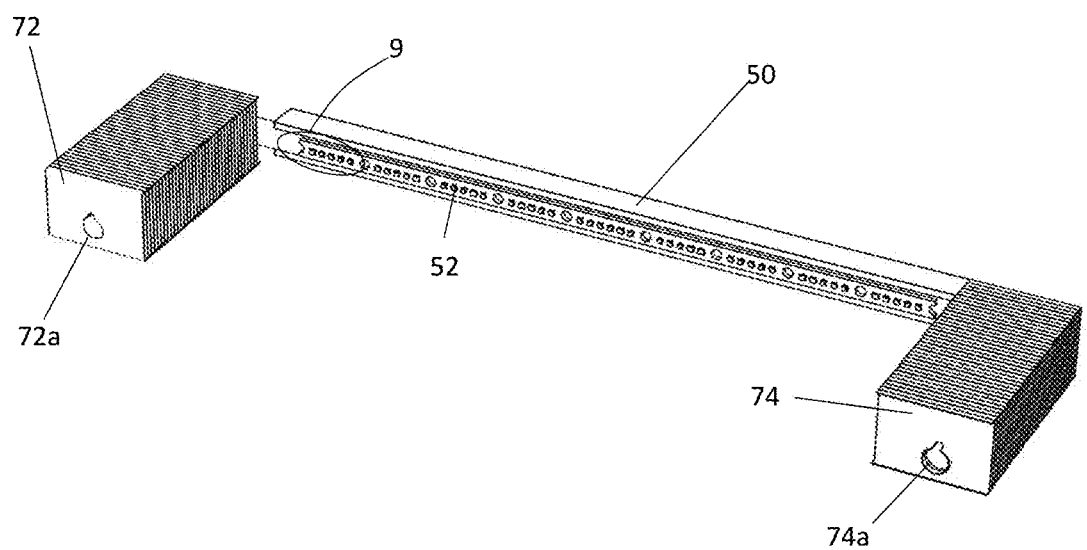
FIG. 7 is a side perspective, partially cut-away view of parts of the lighting assembly of FIG. 1.

As best shown in FIGS. 3, 6, and 10, a diffuser 62, such as in the form of a plate, film, or coating, optionally is positioned adjacent to the lower second major surface 42, i.e., under the light guide 40. The diffuser 62 preferably is coextensive with the light-transmissive opening 34a. The diffuser 62 is selected to diffuse the light emitted through the second major surface 42 to provide a more uniform, homogenous light output distribution. The diffuser 62 provides the secondary benefit of concealing the integrated optical elements 48 (discussed further below). The diffuser 62 can be, for example, a plastic, quartz, frosted, or translucent material or materials. An example of a suitable diffuser is a G-Series Glare Control Diffuser of Brightview Technologies.

At least one, and optionally both, of the first and second major surfaces 41 and 42 include integrated optical elements 48. For example, FIG. 8 illustrates the integrated optical elements 48 integrated into the first major surface 41. The integrated optical elements 48 have a structure suitable for directing light, such as upward from the solid-state light sources 52 and 53 into the light reflector 60, which reflects the light downward to pass through the optional diffuser 62 and the light-transmissive opening 34a. The integrated optical elements 48 may also or alternatively include structure suitable for directing light from the solid-state light sources 52 and 53 directly downward to pass through the optional diffuser 62 and the light-transmissive opening 34a. The integrated optical elements 48 may be convex, concave, cylindrical, prismatic, or a combination thereof. The integrated optical elements 48 may be arrayed in rows and columns. The density of integrated optical elements 48 can be uniform or varied over the first major surface 41 of the light guide 40. The integrated optical elements 48 may be raised structures extending upward from the plane of the first major surface 41 or depressed structures extending downward below the plane of the first major surface 41. The elements 48 may be a physical structure in the light guide 40. For example, the elements 48 can be a screen-printed structure painted on the light guide 40 or a particulate material embedded in the light guide 40.

The integrated optical elements 48 may be identical in shape and/or size to one another or may differ in shape and/or size from one another. For example, the integrated optical elements 48 may have an effective diameter of 1 mm to 1000 mm. In a particularly exemplary embodiment best illustrated in FIG. 8, the integrated optical elements 48 have the appearance of dots or dimples. The integrated optical elements 48 can be formed in or on the light guide 40 in any suitable manner, such as molding, embossing, screen printing, drilling, three-dimensional printing, etching, etc. While it is preferred that the integrated optical elements 48 have a three-dimensional structure extending into or out of the light guide 40, the elements 48 may be formed by imprinting or otherwise depositing a material onto first major surface 41, such as by screen printing, ink jet printing, etc.

Figure 13:
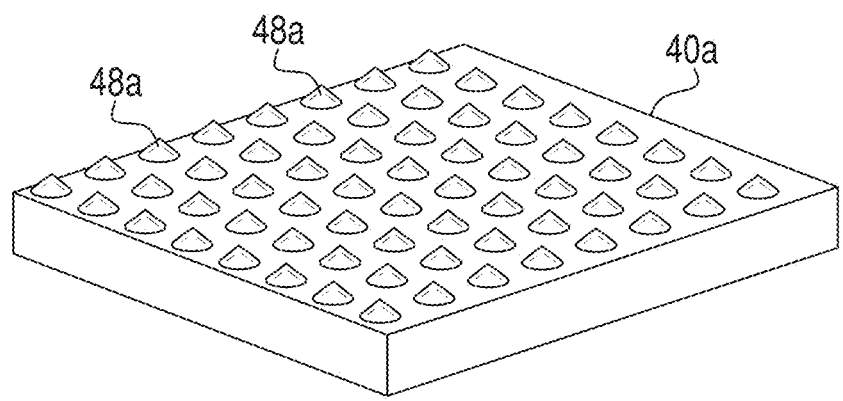
FIG. 13 is an enlarged fragmented view of a light guide according to another embodiment of the invention.
Figure 14:
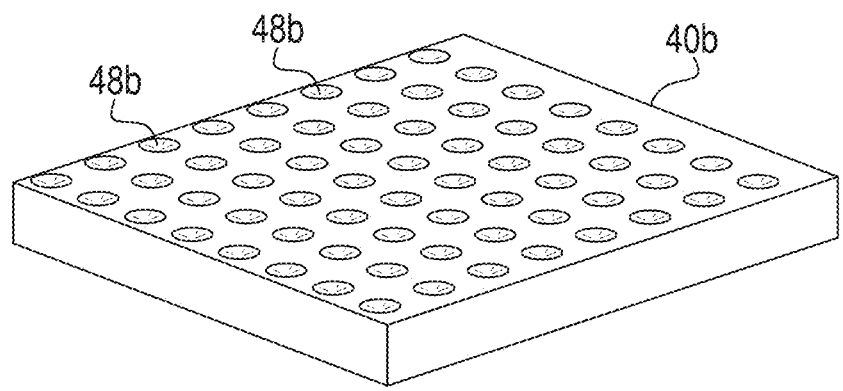
FIG. 14 is an enlarged fragmented view of a light guide according to still another embodiment of the invention.

FIG. 13 is an enlarged fragmented view of a light guide 40a having integrated optical elements 48a configured as cones that protrude outwardly from the surface of guide 40a. The tops of the cones of the integrated optical elements 48a may be flat or curved (e.g., convex). FIG. 14 is an enlarged fragmented view of a light guide 40b having integrated optical elements 48b configured as conical recesses that protrude inwardly from the surface of light guide 40b. The bottoms of the conical recesses of the integrated optical elements 48b may be flat or curved (e.g., concave). Examples of other integrated optical elements 48 are described in U.S. Patent Publication No. 2013/0314944 (which uses the terms "deformities" and "optical deformities" and the like), the complete disclosure of which is incorporated herein by reference.

A representative material that may be used as the light guide 40 is a PMMA clear light guiding prismatic plate LGP provided by Jungbecker. The LGP decouples light which is fed into the light guide from the edges across the surface area by the use of the integrated microprismatic optics 48. The LGP uses reflection and refraction of the microprisms to direct and "deglare" light.

Without wishing to be necessarily bound by any theory, it is believed that the integrated optical elements 48, 48a, 48b of the light guide 40 cause light entering the light guide 40 to experience total internal reflection ("TIR"). The integrated optical elements 48, 48a, 48b interact with the light entering through the edge surfaces of the light guide 40 and propagating therethrough to redirect and uniformly distribute the light so that it is emitted through the second major surface 42. The reflector 60 causes any light which is directed upward by the integrated optical elements 48, 48a, 48b to reflect downward and emitted through the second major surface 42. At the same time, the integrated optical elements 48, 48a, 48b reduce if not eliminate the color bands by homogeneously blending the light so that it is emitted as an incoherent and blended light appearing as a very diffused uniform spectrum. As a result, the need for an excess number of LEDs is avoided, which lowers manufacturing and operating costs and reduces the amount of heat generated by the LED light sources 52 and 53.

In order to create a close approximation of a natural environment, the lighting assembly 30 may include a controller having the capability of providing diverse outputs such as different light intensities, different light patterns, different light colors, etc. Examples of different operating modes that may be selected by varying the outputs include night, sunrise, day, sunset, lunar colors, storms, and solar cycles. The lighting assembly 30 may be provided with a user interface (not shown) to allow programming of the operating modes. Alternatively, operating modes may be pre-programmed into the assembly 30 or may be remotely programmed by communicating with a receiver (not shown), such as a wireless communication device (e.g., Wi-Fi module), of the assembly 30.

Figure 5:
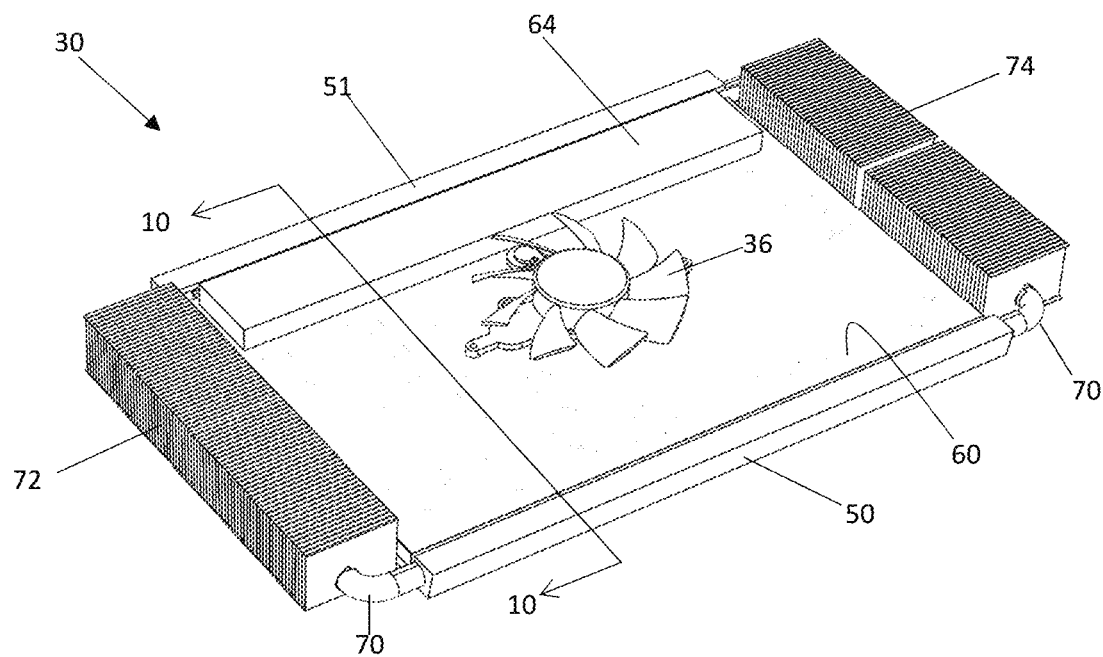
FIG. 5 is a top perspective view of the lighting assembly of FIG. 1 in a partially disassembled state with the light assembly housing not shown.

FIGS. 5 and 6 depict a block 64 housing, for example, controllers, microprocessors, circuitry, modules, drivers, and/or other electronic components (not shown but known in the art and described in U.S. Pat. No. 9,839,206) to control operation of the light sources and the pumps 26. The circuitry/electronic components of the block 64 may include, for example, microcontrollers or microprocessors for receiving and processing data and providing output to control the components of the lighting assembly 30. The microprocessor(s) may be connected to a driver that controls the output of the light sources, for example by varying the wavelength and intensity of individual or groups of light sources, by cycling on and off individual or groups of light sources, or through a combination of both. This allows the lighting assembly 30 to provide different lighting characteristics and patterns. Together with controlled water circulation via the pumps 26, the conditions of the habitat 15 can be controlled to mimic day-and-night cycles and seasonal cycles by varying light intensity, color, and on/off state. In this manner, the overall light color emitted by the lighting assembly 30 may be controlled locally or remotely to promote the growth and health of specific organisms in the habitat 15, such as plants, coral or anemones.

Light sources such as LEDs produce large amounts of heat that can adversely affect the efficacy of the LEDs and, in extreme circumstances, damage the electronics 64 and the PCBs 54 and 55 of the lighting assemblies 30 of the habitat 15. Generally, the lighting assemblies of the type used with habitats 15 are relatively small and compact, and are unable to adequately disperse the heat generated by light sources such as LEDs.

According to an exemplary embodiment of the invention, heat insulators and/or a heat transfer system may be provided to protect the components 64 from the heat generated by operation of the light sources. As best shown in FIGS. 4-7, 10, and 11, the lighting assembly 30 includes a heat transfer system comprising one or more heat pipes 70 configured to transfer heat away from the heat sources, i.e., the light sources 52 and 53 such as LEDs, to baffles or fins 72 and 74 adjacent opposite end edge surfaces 45 and 46, respectively, of the light guide 40. The heat pipes 70 extend through passages 72a and 74a of the fins 72 and 74. The heat pipes 70 carry the heat from the light sources 52 and 53 to the fins 72 and 74, so that the heat is transferred to the fins 72 and 74. Cooler air drawn through the air intake opening 33a into the lighting assembly 30 by the fan 36 is blown against the fins 72 and 74. The large surface area provided by the fins 72 and 74 provides a large interface for the cool air to remove heat released from the heat pipes 70 and expel the resulting hot air through the air discharge openings 35a.

An example of a suitable commercially available heat pipe is available from Cooling Technologies, Inc. (formerly HPEV), which advertises its heat pipes as passive (no moving parts or external power). According to Cooling Technologies, Inc., the heat pipe is a sealed tube with a layer of wick material surrounding a hollow core filled with fluid. Heat entering the sealed tube causes the fluid to vaporize and travel to the cooler end, which in the case of the embodied lighting unit will be the fins 72, where the heat is released and the vapor condenses back into a fluid.

Other heat insulators and/or heat insulating systems may be used. For example, one or more vapor chambers may be included in the lighting assembly 30 to transfer heat away from the light sources 52 and 53.

The lighting assembly 30 may be powered by an external power source, such as an AC source, in which case a rectifier or comparable AC/DC device may be used to rectify the alternating current (AC) to direct current (DC). A driver or drivers convert(s) constant voltage from the power supply to a constant current output with a voltage sufficient to overcome the "forward voltage" of the diode(s). Alternatively, a DC source such as a battery may be provided as the primary power source or as a backup secondary power source.

Figure 12:
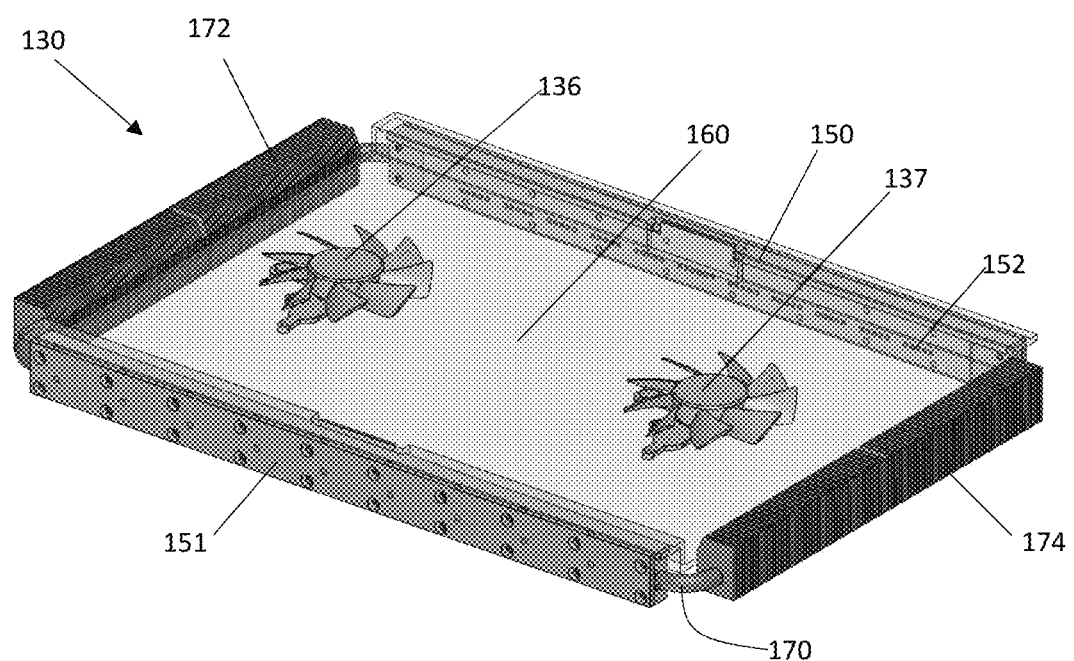
FIG. 12 is a top perspective, partially disassembled view of a lighting assembly according to another embodiment of the invention.

A lighting assembly according to another embodiment of the invention is generally indicated by reference numeral 130 in FIG. 12, in which like reference numerals of the first lighting assembly 30 of FIGS. 1-10 are used to designate corresponding parts of the lighting assembly 130, except with the addition of "100" to the reference numerals in FIG. 12. The above description of those corresponding parts of the lighting assembly 30 is incorporated herein by reference with respect to the description of the lighting assembly 130.

The lighting assembly 130 is generally the same as the lighting assembly 30, except for the addition of a second fan 137. Although not shown, the outer housing (not shown in FIG. 12) of the lighting assembly 130 would be provided with an additional air intake opening identical to 33a to as to extend over the second fan 137.

Assembly of the lighting assemblies 30 and 130 is within the purview of a person of ordinary skill in the art having reference to this disclosure. According to one exemplary embodiment, the cover 33 is separated from the remainder of the outer housing 32 to provide access to the internal cavity of the outer housing. The diffuser 62 is placed in the outer housing 32 and optionally secured to on the lower surface or base 34 to cover or fit within the light-transmissive opening 34a. The first and second light source holders 50 and 51 are arranged to receive the heat pipe 70, and the printed circuit boards (PCB) 54 and 55 with the solid-state light sources 52 and 53 preinstalled are arranged at and secured to (e.g., solder, fastener, etc.) the opening of the first light source holder 50. The resulting subassembly is placed in the outer housing 32. If the support base 63 (FIG. 9) is used, the light source holders 50 and 51 may be supported on or attached to the support base 63.

The light guide 40 is placed in the outer housing 32 so that the solid-state light sources 52 and 53 are adjacent to side edge surfaces 43 and 44 of the light guide 40. A reflector 60 is either pre-installed on the light guide 40 or is placed in the outer housing 32 on the first major surface 41 of the light guide 40. The electronics block 64 is placed on the reflector 60. The air circulation device/fan 36 may be secured to the cover 33 using a bracket (not shown), and the cover 33 is attached to the remainder of the outer housing 32.

The various components and features of the above-described exemplary embodiments may be substituted into one another in any combination. It is within the scope of the invention to make the modifications necessary or desirable to incorporate one or more components and features of any one embodiment into any other embodiment. In addition, although the exemplary embodiments discuss steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to necessarily limit the invention to the exemplary embodiments disclosed.

What is claimed is:

1. A habitat lighting assembly, comprising:
   an outer housing comprising an air intake opening, an air discharge opening, and a base with a light-transmissive opening;
   an air circulation device configured to generate a flow of air into the outer housing through the air intake opening and out of the outer housing through the air discharge opening;
   a light guide contained in the outer housing and positioned over the light-transmissive opening, the light guide comprising opposite first and second major surfaces and at least one edge surface extending between the first and second major surfaces;

a solid-state light source contained in the outer housing and arranged to emit light into the edge surface of the light guide;

a plurality of integrated optical elements associated with the first major surface and configured to redirect the light emitted by the solid-state light source; and a heat transfer system configured to transfer heat generated by the solid-state lighting source to the flow of air generated by the air circulation device.

2. The habitat lighting assembly of claim 1, wherein the heat transfer system comprises at least one heat pipe proximate the solid-state light source to transfer heat away from the solid-state light source.

3. The habitat lighting assembly of claim 2, wherein the heat transfer system comprises a plurality of fins through which the heat pipe passes, the plurality of fins being located in a path of the flow of air generated by the air circulation device.

4. The habitat lighting assembly of claim 3, wherein the fins are positioned at the air discharge opening.

5. The habitat lighting assembly of claim 1, wherein the solid-state light source comprises light-emitting diodes, laser diodes, organic light emitting diodes, or any combination thereof configured to produce multiple colors.

6. The habitat lighting assembly of claim 1, further comprising a light reflector positioned over the light guide, wherein the optical elements are configured to redirect light emitted by the solid-state light source upward toward the light reflector.

7. The habitat lighting assembly of claim 1, wherein the optical elements are configured to redirect light emitted by the solid-state light source downward through the light-transmissive opening.

8. The habitat lighting assembly of claim 1, wherein the optical elements comprise three-dimensional structures extending into or out of the first major surface.

9. The habitat lighting assembly of claim 8, wherein the optical elements are cones or recesses configured to redirect light.

10. The habitat lighting assembly of claim 1, wherein:
the at least one edge surface comprises first and second edge surfaces on opposite sides or opposite ends of the light guide; and
the solid-state light source comprises a first solid-state light source associated with the first edge surface to emit light into the first edge surface and a second solid-state light source associated with the second edge surface to emit light into the second edge surface.

11. A combination, comprising:
a habitat; and
the habitat light assembly of claim 1 configured to provide light to the habitat.

12. An aquarium, comprising:
a tank having a chamber; and
a habitat light assembly associated with the tank and configured to provide light to the chamber of the tank, the habitat lighting assembly comprising
an outer housing comprising an air intake opening, an air discharge opening, and a base with a light-transmissive opening;

an air circulation device configured to generate a flow of air into the outer housing through the air intake opening and out of the outer housing through the air discharge opening;

a light guide contained in the outer housing and positioned over the light-transmissive opening, the light guide comprising opposite first and second major surfaces and at least one edge surface extending between the first and second major surfaces;

a solid-state light source contained in the outer housing and arranged to emit light into the edge surface of the light guide;

a plurality of integrated optical elements associated with the first major surface and configured to redirect the light emitted by the solid-state light source; and a heat transfer system configured to transfer heat generated by the solid-state lighting source to the flow of air generated by the air circulation device.

13. A habitat lighting assembly, comprising:
a light guide comprising opposite first and second major surfaces and at least one edge surface extending between the first and second major surfaces;

a solid-state light source arranged to emit light into the edge surface of the light guide, the solid-state light source comprising light-emitting diodes, laser diodes, organic light emitting diodes, or any combination thereof configured to produce multiple colors;

a plurality of integrated optical elements associated with the first major surface and configured to redirect the light emitted by the solid-state source; and a light reflector positioned over the light guide, wherein the optical elements are configured to redirect light emitted by the solid-state light source upward toward the light reflector.

14. The habitat lighting assembly of claim 13, wherein the optical elements are configured to redirect light emitted by the solid-state light source downward.

15. The habitat lighting assembly of claim 13, wherein the optical elements comprise three-dimensional structures extending into or out of the first major surface.

16. The habitat lighting assembly of claim 15, wherein the optical elements are cones or recesses configured to redirect light.

17. The habitat lighting assembly of claim 13, wherein:
the at least one edge surface comprises first and second edge surfaces on opposite sides or opposite ends of the light guide; and
the solid-state light source comprises a first solid-state light source associated with the first edge surface to emit light into the first edge surface and a second solid-state light source associated with the second edge surface to emit light into the second edge surface.

18. The habitat light assembly of claim 13, further comprising an outer housing comprising an air intake opening, an air discharge opening, and a base with a light-transmissive opening, the outer housing containing the light guide and the solid-state light source.

19. The habitat lighting assembly of claim 18, further comprising means for dissipating heat generated by the solid-state light source.

20. A combination, comprising:
a habitat; and
the habitat light assembly of claim 12 configured to provide light to the habitat.

* * * * *